Feb. 18, 1964 K. G. HELLER 3,121,440
TWO-DIRECTIONAL PROPORTIONAL THRUST-CONTROL VALVE
Filed March 14, 1960 3 Sheets-Sheet 1

INVENTOR:
KENNETH G. HELLER
BY
ATTORNEYS

Feb. 18, 1964 K. G. HELLER 3,121,440
TWO-DIRECTIONAL PROPORTIONAL THRUST-CONTROL VALVE
Filed March 14, 1960 3 Sheets-Sheet 2
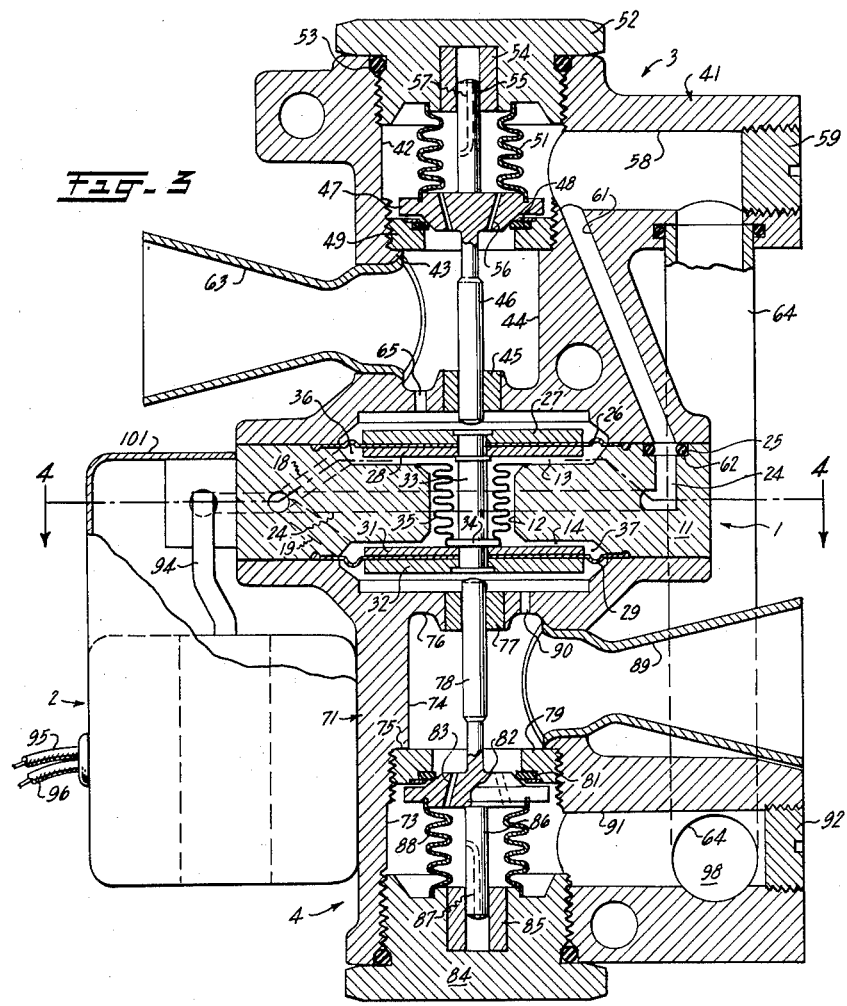
INVENTOR:
KENNETH G. HELLER
BY
ATTORNEYS

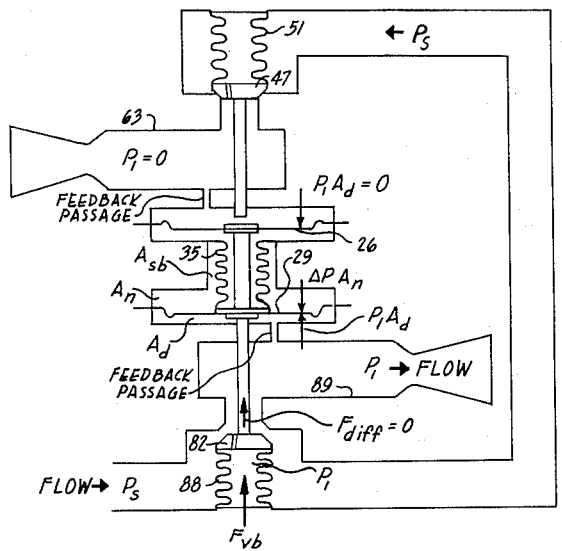

United States Patent Office 3,121,440
Patented Feb. 18, 1964

3,121,440
TWO-DIRECTIONAL PROPORTIONAL THRUST-CONTROL VALVE
Kenneth G. Heller, Redwood City, Calif., assignor to American Radiator & Standard Sanitary Corporation, New York, N.Y., a corporation of Delaware
Filed Mar. 14, 1960, Ser. No. 14,850
3 Claims. (Cl. 137—85)

This invention relates to and in general has for its object the provision of a bidirectional proportional thrust-control valve suitable, for example, for controlling the attitude of an orbiting vehicle in response to a signal from an attitude-sensor.

In some instances it is desirable to control the attitude of an orbiting vehicle relative to one of its attitude axes by mounting a pair of opposed valved jet orifices on said vehicle at right angles to and offset from said axis and connected with a source of fluid pressure, said valves being under the selective control of an attitude-sensor or command signal.

More specifically, one of the objects of this invention is the provision of a pair of opposed, valved thrust nozzles the valves of which are under the selective control of a pilot valve, the latter in turn being under the control of a condition-responsive means such as, for example, an attitude-sensor.

Another object of this invention is the provision of a valve of the character above described wherein the input or command signal produces an essentially proportional gas reaction thrust output, with the direction of the thrust being dependent upon the polarity of the input or command signal.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 3 is a vertical section taken on the line 3—3 of FIG. 1.

FIG. 4 is a horizontal section taken on the offset line 4—4 of FIG. 3.

FIG. 5 is a diagrammatic illustration of the valve shown in FIGS. 1-4 devoid of structural details so as to better illustrate the theory of operation of the valve.

*General Construction*

Figure 1:
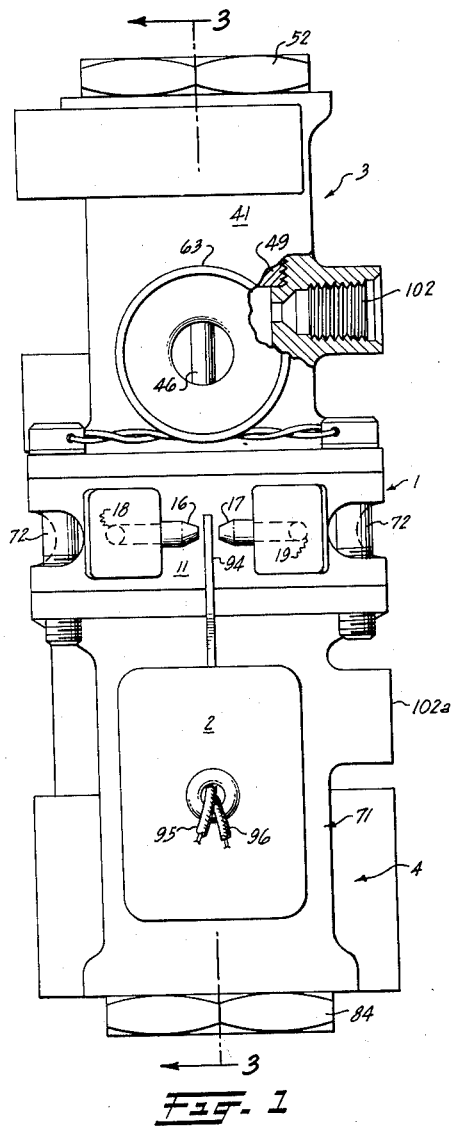
FIG. 1 is a left-hand side elevation of a proportional thrust valve embodying the objects of my invention with a portion thereof broken away to better illustrate its construction.

In general the valve shown in these various figures includes a central pilot valve assembly generally designated by the reference numeral 1; a torque motor or other condition-responsive means for controlling the pilot valve assembly and generally designated by the reference numeral 2; and first and second pressure-regulating valve assemblies and thrust nozzles operatively associated with and under the control of the pilot valve assembly and generally designated respectively by the reference numerals 3 and 4.

*Pilot Valve Assembly*

The pilot valve assembly is constructed around a generally rectangular block or casting 11 formed with a central bore 12, with an upper circular recess 13 surrounding the upper end of the bore 12 and with a lower circular recess 14 surrounding the lower end of the bore 12.

Formed in the left-hand side of the block 11 is a rectangular recess 15 and mounted to said block within the confines of the recess 15 are a pair of opposed, transversely spaced coaxial nozzles 16 and 17. Formed in block 11 is an upwardly offset passageway or conduit 18 communicating at its outer left-hand end with the nozzle 16 and communicating at its inner end with the circular recess 13 surrounding the upper end of the bore 12. Similarly formed in the block 11 is a downwardly offset passageway or conduit 19 communicating at its outer left-hand end with the nozzle 17 and communicating at its inner end with the circular recess 14 surrounding the lower end of the bore 12.

Extending between the passageways 18 and 19 intermediate the ends thereof is a passageway or conduit 21 and located therein are a pair of fixed, identical and symmetrically positioned pilot orifices 22 and 23. Connected to the conduit 21 midway between the orifices 22 and 23 is a conduit 24 extending across the block 11 and terminating at the upper face thereof in an O ring recess 25. The fixed orifices 22 and 23 merely serve as constrictions. The same functional result could be obtained by either diminishing the diameter of the conduit 21 or by increasing the length thereof. Functionally the conduit 21 can be considered as a constricted conduit or passageway.

Sealed to the upper face of the block 11 across its circular recess 13 is a circular flexible diaphragm 26 fixed to and sandwiched between a pair of discs 27 and 28. Similarly fixed to the lower face of the block 11 is a metal diaphragm 29 likewise sandwiched between a pair of metal discs 31 and 32. Extending between the discs 27 and 32 and fixed thereto is an axial pin or stem 33. Surrounding the pin 33 and fixed to the lower disc 31, through a flange 34 formed integral with the pin 33, is the lower end of a sylphon bellows 35. The upper end of the bellows 35 is overturned and sealed to the block 11 around the upper end of its bore 12.

As a result of this construction the interior of the bellows 35 and the upper block recess 13 form an inner expandable chamber 36 in communication with the conduit 18 which in turn is in communication with the nozzle 16 and through the fixed orifice 22 with the conduit 24. Similarly the space exterior to the bellows 35 forms with the lower block recess an outer sealed expandable chamber 37 communicating through the conduit 19 with the nozzle 17 and through the fixed orifice 23 with the conduit 24.

*Upper Pressure-Regulating Valve Assembly*

Seated on top of the pilot valve block 11 and secured thereto by means to be later described is a valve body 41. Formed in the valve body 41 is a bore 42 formed with a shoulder 43, a stepped bore 44 and a guide bushing 45, all coaxial with the pilot valve pin or stem 33. Slidably mounted in the guide bushing 45 is a valve stem 46, the lower end of which is arranged to ride on the upper end of the pilot valve stem 33 and move therewith.

Mounted on the upper end of the valve stem 46 is a tapered valve closure member 47 arranged to close on a resilient seat seal gasket 48 seated in a recess formed in a valve seat 49, the seat 49 being threaded within the lower end of the bore 42 in abutment with the shoulder 43. Secured to and sealed around the upper end of the closure member 47 is the lower end of a resilient sylphon bellows 51. Sealed to the upper end of the bellows 51 is a plug 52, the latter being threaded into the bore 42 and sealed to the upper end of the valve body 41 by an O ring 53. Mounted in the plug 52 is a bushing 54 serving as a bearing for the upper end of an extension 55 of the stem 46. Formed in the valve closure member 47 are one or more pressure release holes 56 and formed in the valve stem extension 55 is an air bleed channel 57. Communicating with the valve bore 42 is a conduit 58 the outer end of which is closed by a screw plug 59.

Extending through the valve body 41 is a conduit 61 communicating at its upper end with the conduit 58 and communicating at its lower end with the conduit 24 of the pilot valve assembly through an O ring 62 mounted in the recess 25. Mounted on one side of the valve body 41 in communication with the stepped bore 44 and extending radially therefrom is convergent-divergent thrust nozzle 63.

Fixed and sealed to the valve body 41 in communication with the conduit 58 is a depending conduit 64, the function of which will be presently described, in connection with a description of the lower pressure-regulating valve assembly.

Extending between the stepped bore 44 and the space above the diaphragm 26 is a feedback hole, conduit, or passageway 65.

Lower Pressure-Regulating Valve Assembly

The lower pressure-regulating valve assembly is virtually a mirror image of the upper pressure-regulating valve assembly and includes a valve body 71 arranged to be secured thereto and to the pilot valve assembly by bolts 72.

Formed in the valve body 71 is a bore 73, a stepped bore 74 and an intermediate radial shoulder 75. Mounted in the ceiling 76 of the stepped bore 74 is a bushing 77 serving as a bearing for a valve stem 78, the upper end of which is arranged to engage the lower end of the pilot valve stem 33. Threaded into the upper end of the bore 73 and seated on the shoulder 75 is a valve seat 79 and recessed in the seat 79 is a resilient seat seal gasket 81. Fixed to the lower end of the valve stem 78 and arranged to seat on the seat 79 is a tapered valve closure member 82. Formed in the closure member 82 are one or more air holes 83. Threaded into the lower end of the bore 73 is a cap or plug 84, and mounted centrally thereon is a bushing 85 serving as a bearing for the lower end of a valve stem extension 86. Formed in the valve stem extension is an air bleed channel 87. Fixed to and between the valve closure member 82 and the plug 84 is a resilient sylphon bellows 88.

Secured to the valve body 71 and extending radially therefrom in a direction 180° away from the thrust nozzle 63 is a second convergent-divergent thrust nozzle 89 communicating with the counterbore 74. Extending between the stepped bore 74 and the space below the diaphragm 29 is a feedback, conduit, or passageway 90.

Communicating with the bore 73 is a conduit 91, the outer end of which communicates with the lower end of the conduit 64, this end of said latter conduit being secured and sealed to the valve body 71 at this point. Threaded into the outer end of the conduit 91 is a plug 92 merely serving to seal off this end of the conduit.

The torque motor 2 is mounted on a side of the valve body 71 and includes an offset torque arm 94, the upper end of which, as best shown in FIG. 4, is located between the opposed nozzles 16 and 17. The motor 2 is arranged to communicate through electrical leads 95 and 96 with an input or demand signal such as a signal from an attitude-sensor and its associated amplifiers, etc.

Provided in the lower end of the lower valve casing 71 is a threaded gas inlet connection 97 communicating through a conduit 98 with the conduit 64. The inlet connection is arranged to be connected with a gas generator or other source of gas under pressure (not shown). Clipped to the motor 2 and surrounding the torque arm 94 and nozzles 16 and 17 is a readily removable cover or hood 101.

From this construction it will be seen that the conduit 64 serves as a manifold for maintaining the intake side of each of the control valve assemblies under a gaseous pressure.

Optionally the valves 41 and 71 can be provided with threaded telemetering connections 102 and 102a.

Theory

Ideal theory shows that the reaction thrust from a fully expanding convergent-divergent nozzle discharging compressible fluid is $$F = C_f A_t P_1$$

where F is the thrust force, $A_t$ is the nozzle throat area, $P_1$ is the pressure at the inlet to the nozzle, and $C_f$ is a thrust coefficient given by:

$$C_f = \sqrt{\frac{2K^2}{K-1}\left(\frac{2}{K+1}\right)^{\frac{K+1}{K-1}}\left[1-\left(\frac{P_2}{P_1}\right)^{\frac{K-1}{K}}\right]} + \frac{P_2-P_3}{P_1}\frac{A_2}{A_t}$$

in which K is the ratio of specific heats for the gas under consideration, $P_2$ is the gas pressure at the nozzle exit plane of area $A_2$, and $P_3$ is the ambient pressure.

If $P_3$ is zero, as is the case in connection with orbiting vehicles, it can be shown that $C_f$ is constant for a given nozzle and gas for all values of $P_1$. The thrust F is thus proportional to the product $A_t P_1$. It is then possible to obtain thrust control by modulating either $A_t$ or $P_1$, or both. Actual nozzle performance has been found to be very close to that calculated by ideal theory.

In the instant case, thrust control is effected by modulating $P_1$ through the operation of the pilot valve.

More specifically, the pilot valve assembly above described serves to establish a controlled difference in pressure between the inner and outer expandable chambers 36 and 37. Gas from the inlet connection 97 flows through conduit 61 to the two fixed orifices 22 and 23 respectively, and through these orifices to the two variable pilot nozzles 16 and 17. If a positive command signal is received by the torque motor 2, its torque arm 94 will be urged upwardly (as viewed in FIG. 4) toward the upper nozzle 16 and away from the lower nozzle 17. This causes the pressure in the upper nozzle 16 to rise and that in the lower nozzle 17 to fall, thus establishing a pressure differential, ΔP. The torque arm 94 will move toward the upper nozzle until an equilibrium is reached between the torque due to the pressure differential (ΔP·nozzle area·torque arm) and the electromagnetic torque of the motor. A negative demand signal imposed on the torque arm 94 will produce the reverse result. Thus, the differential pressure between the nozzles 16 and 17 has a magnitude and direction proportional to the magnitude and polarity of the command signal.

This differential pressure is equally felt across the diaphragms 26 and 29 of the pilot valve assembly. With a positive command signal, a positive differential pressure is established in which the pressure in the inner pilot valve chamber 36 exceeds that in the outer valve chamber 37, thus biasing the pilot valve assembly upward (as viewed in FIG. 3). The resulting upward movement of the diaphragm assembly causes the upper valve closure member 47 to rise off its seat, leaving lower valve closure member 82 in its closed position. Thus, gas will flow outwardly through the upper thrust nozzle 63 to produce a positive thrust. During this stage of the operation of the device no gas flows through the lower nozzle for, as above stated, its associated control valve remains closed. A negative demand signal imposed on the torque motor 2 will of course produce a reaction reverse to that just described. When no demand signal is imposed on the motor, the pressure within the two pilot valve diaphragm chambers becomes equalized, and both control valves therefore remain closed until another demand signal occurs.

Figure 2:
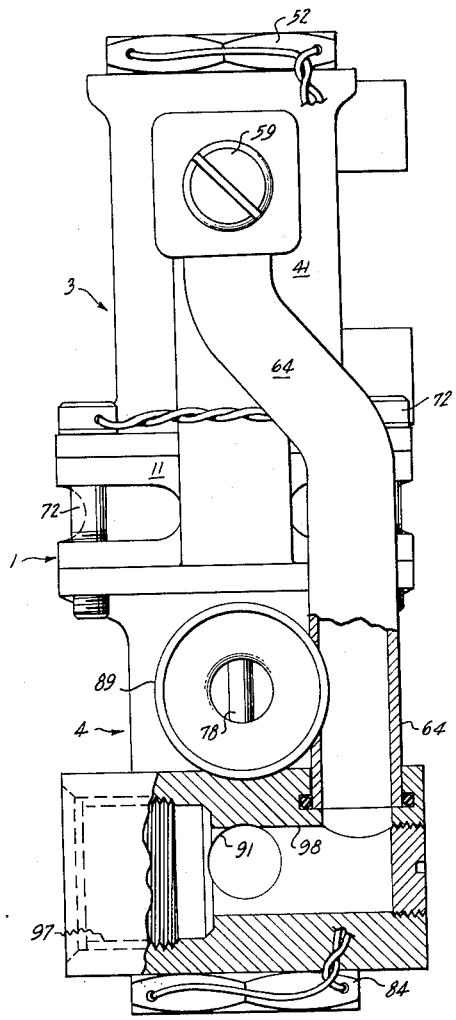
FIG. 2 is a right-hand side elevation of the valve illustrated in FIG. 1.

As illustrated in FIGS. 1-4, the two valve assemblies 3 and 4 are essentially identical, are arranged back-to-back so as to minimize space and weight, and operate on the pressure-dome and diaphragm principle of pressure regulation.

This action is diagrammatically illustrated in FIG. 5 wherein:

The net diaphragm area $$A_n = A_d - A_{sb}$$

$A_d$ = effective diaphragm control area,
$A_{sb}$ = effective pressure area of the pilot valve sylphon bellows.

The force $\Delta P A_n$ resulting from differential pressure $\Delta P$ in the pilot valve assembly acting over the net diaphragm area $A_n$ tends to move the appropriate valve closure member (47 or 82) off its seat. This force is resisted by (a) the spring force ($F_{vb}$) of the appropriate sylphon bellows (51 or 88), and (b) the pressure feedback force exerted by $P_1$ on the control area $A_d$, of the appropriate diaphragm 26 or 29. The pressure $P_1$ at the inlets of the thrust nozzles 63 and 89 is fed back to the outer sides of the diaphragms 26 and 29 through the pressure feedback holes 65 and 90. The sylphon bellows 51 and 88 serve to enclose their associated valve closure members (47 and 82) and to form sealed chambers, each having an effective internal area equal to the effective seating area of the valve closure members. Air passages or holes 56 and 83 are provided respectively in the valve closure members 47 and 82 to permit the controlled pressure $P_1$ to enter into these sealed chambers and thus create a balanced condition. By resorting to this expedient, differential forces ($F_{diff}$) tending to close the closure members 47 and 82 and tending to make $P_1$ sensitive to supply pressure variations are eliminated. Sylphon bellows 51, 88 and 35 are used in preference to simple O rings in order to avoid the Coulomb friction forces inherent in conventional sliding seals.

The pilot valve assembly differential force will cause one of the valve closure members (47 and 82) to lift off its seat until a throttling position is reached at which the above described force equilibrium takes place. At this point, $$P_1 A_d + F_{vb} - \Delta P A_n = 0$$

and $$P_1 = \frac{\Delta P A_n - F_{vb}}{A_d}$$

Since $F_{vb}$ is small (in the order of 1% of $\Delta P_{max} A_n$), it is seen that $P_1$ is proportional to $\Delta P$ within 1% of full-scale output, and thus proportional to the command signal to a similarly high degree. Any tendency of $P_1$ to fluctuate will destroy the force equilibrium, causing the control valves to react forcefully to re-establish equilibrium.

I claim:

1. A thrust-control device comprising: a valve body provided with first and second opposed chambers; first and second diaphragms sealed to said valve body across said first and second chambers respectively; a stem interconnecting said diaphragms; a source of gaseous pressure; means sealing between said chambers; first and second conduits communicating said source of gaseous pressure to said first and second chambers respectively on the stem sides of the diaphragms therein; means for producing a pressure differential in said first and second conduits where they communicate with said chambers; said valve body having first and second thrust passages operatively associated therewith and each having a valve member seatable therein to close off flow through said thrust passages, said thrust passages being connected upstream of said valve members to said source of gaseous pressure; means responsive to movement of said stem in one direction for opening one of said valve members and responsive to movement of said stem in the opposite direction for opening the other of said valve members; means fluidly communicating said first thrust passage downstream of said valve member therein to said first chamber on the side of said first diaphragm opposite to the stem side thereof; means fluidly communicating said second thrust passage downstream of said valve member therein to said second chamber on the side of said second diaphragm opposite to the stem side thereof.

2. A thrust-control device comprising: a valve body provided with first and second opposed chambers; first and second diaphragms sealed to said valve body across said first and second chambers respectively; a stem interconnecting said diaphragms; means sealing between said chambers; a source of gaseous pressure; first and second conduits communicating said source of gaseous pressure to said first and second chambers respectively on the stem side of the diaphragms therein; a pair of opposed axially-spaced nozzles connected one each to said first and second conduits; condition-responsive means for selectively modulating the relative opening of said nozzles; said valve body having first and second thrust passages operatively associated therewith and each including a valve member seatable therein to close off flow through said thrust passages; means responsive to movement of said stem in one direction for opening said valve member in said first thrust passage and means responsive to opposite movement of said stem for opening said second thrust passage valve member; said thrust passages each being connected upstream of the valve members therein to said source of gaseous pressure; means fluidly communicating said first thrust passage downstream of said valve member therein to said first chamber on the side of said first diaphragm away from said first conduit; and means fluidly communicating said second thrust passage downstream of said valve member therein to said second chamber on the side of said second diaphragm away from said second conduit.

3. A thrust-control device comprising: a valve body provided with first and second opposed chambers joined by an intervening third chamber, the cross-sectional area of said third chamber being substantially smaller than the cross-sectional area of either of said first and second chambers; a first and second diaphragms sealed to said valve body across said first and second chambers respectively; a sylphon bellows disposed within said third chamber, one end of said bellows being secured and sealed to one of said diaphragms and its other end being secured and sealed to said valve body; a stem interconnecting said diaphragms; a constricted conduit communicating at one of its ends with one of said chambers at a point external to said sylphon bellows and its other end with the interior of said sylphon bellows; a source of gaseous pressure communicating with said constricted conduit at a point intermediate the ends thereof; a pair of opposed axially-spaced nozzles connected one each adjacent each end of said constricted conduit; condition-responsive means for selectively modulating the relative opening of said opposed nozzles; said valve body having first and second thrust passages operatively associated therewith and each including a valve member seatable to close off flow through said thrust passages; means responsive to movement of said stem in one direction for opening one of said valve members and means responsive to movement of said stem in the opposite direction for opening the other of said valve closure members; said thrust passages being connected upstream of said valve members therein to said source of gaseous pressure; passage means communicating said first thrust passage downstream of said valve member therein to said first chamber to subject the side of said first diaphragm facing away from said second diaphragm to the downstream pressure of said first thrust passage; passage means communicating said second thrust passage downstream of said valve member therein to said second chamber to subject the side of said second diaphragm facing away from said first diaphragm to the downstream pressure of said second thrust passage.

(References on following page)

References Cited in the file of this patent

UNITED STATES PATENTS

| | | |
|---|---|---|
| 716,418 | Hochsten | Dec. 23, 1902 |
| 1,992,343 | Ahnstrom | Feb. 26, 1935 |
| 2,075,600 | Baker | Mar. 30, 1937 |
| 2,637,273 | Stokes | May 5, 1953 |
| 2,674,268 | Kimm | Apr. 6, 1954 |
| 2,726,510 | Goddard | Dec. 13, 1955 |
| 2,879,781 | Gimson | Mar. 31, 1959 |
| 2,910,088 | Natho | Oct. 27, 1959 |